W. A. FIFIELD.
ROLLER ATTACHMENT FOR GRAIN DRILLS.
APPLICATION FILED JAN. 31, 1918.
1,286,268.
Patented Dec. 3, 1918.
2 SHEETS—SHEET 1.
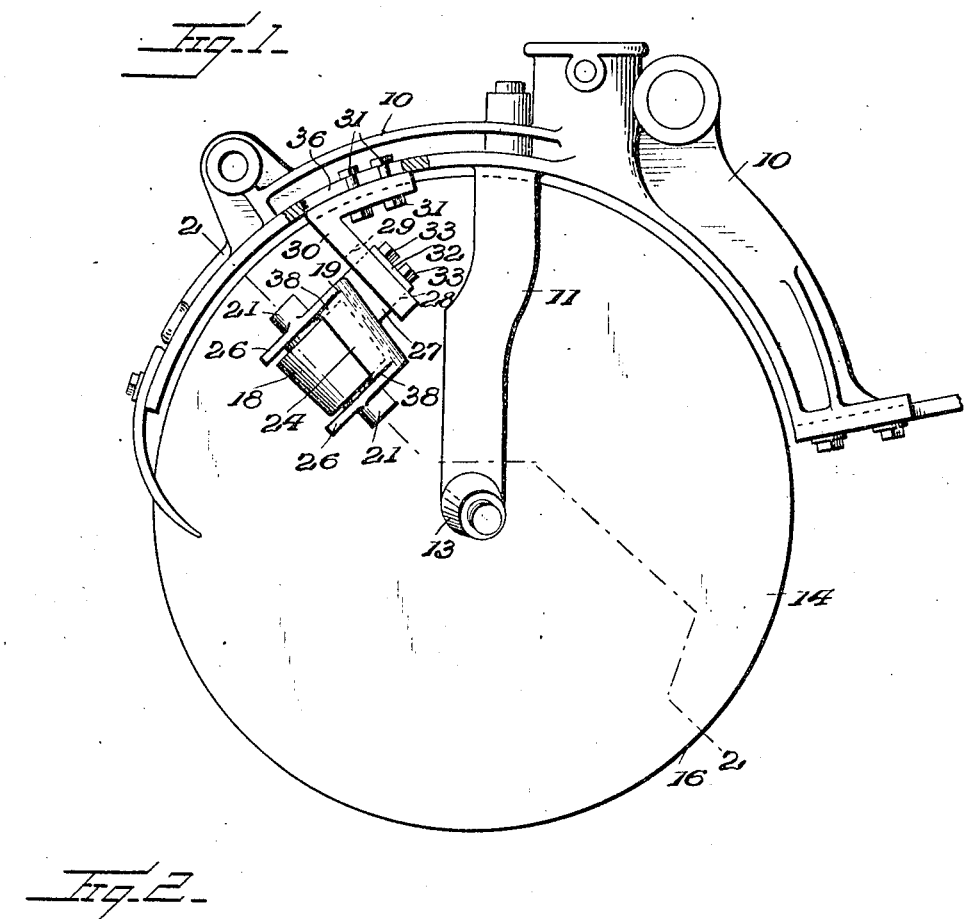
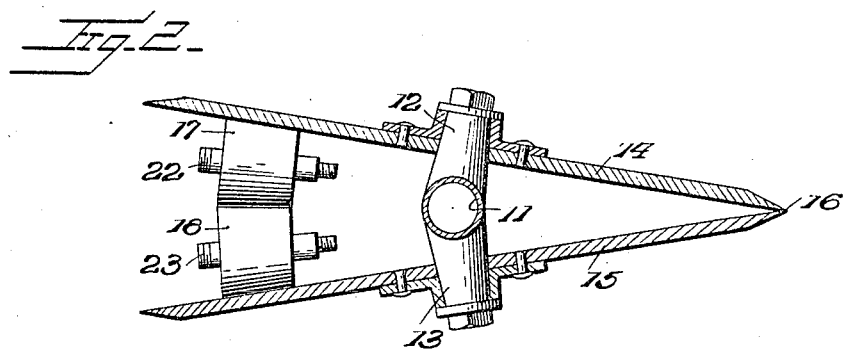
Inventor
W. A. Fifield.
By Lacey & Lacey, Attorneys

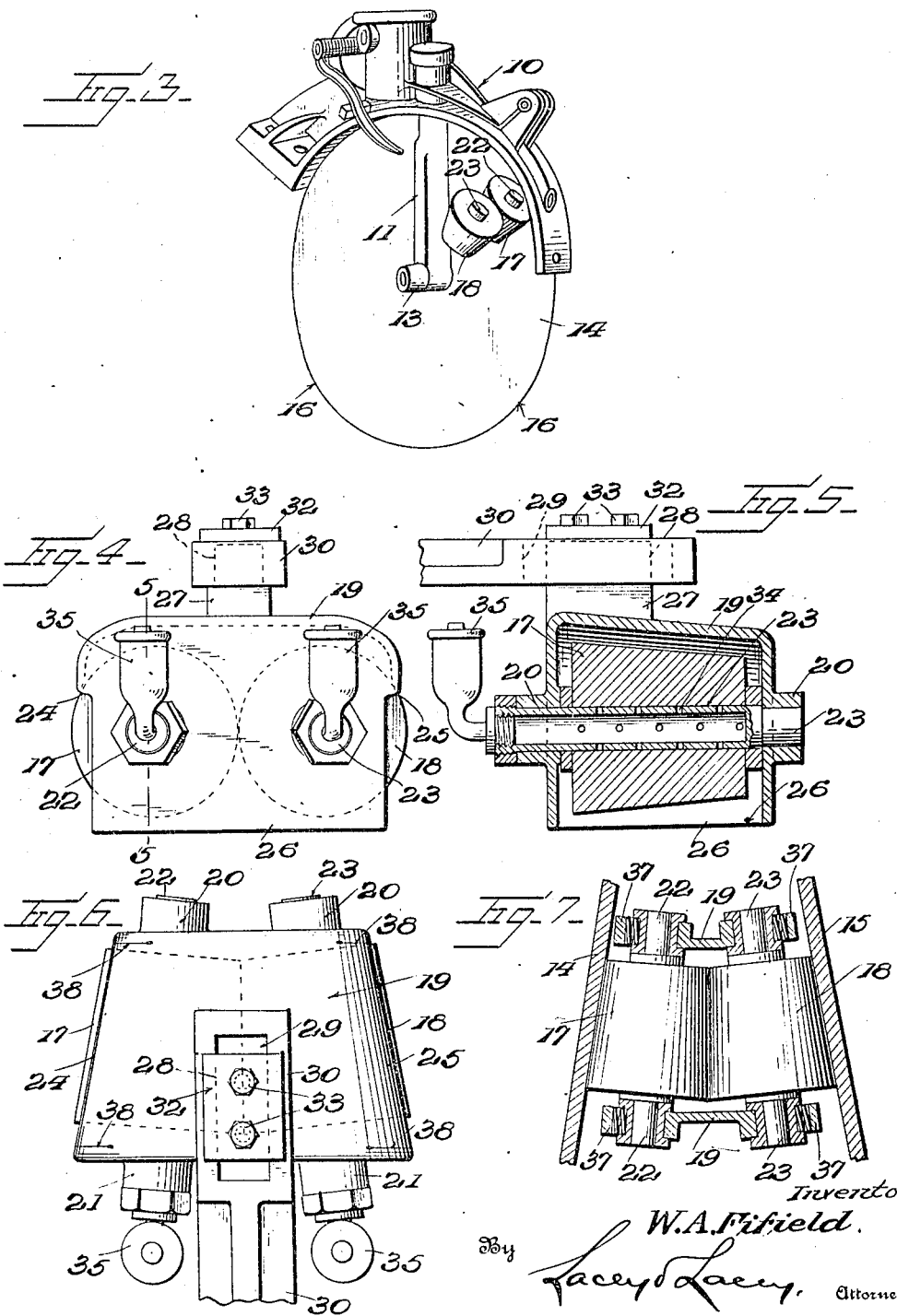

UNITED STATES PATENT OFFICE.

WILLIAM A. FIFIELD, OF ABBEY, SASKATCHEWAN, CANADA.

ROLLER ATTACHMENT FOR GRAIN-DRILLS.

1,286,268.  Specification of Letters Patent.  Patented Dec. 3, 1918.

Application filed January 31, 1918. Serial No. 214,679.

*To all whom it may concern:*

Be it known that I, WILLIAM A. FIFIELD, subject of the King of Great Britain, residing at Abbey, Province of Saskatchewan, Canada, have invented certain new and useful Improvements in Roller Attachments for Grain-Drills, of which the following is a specification.

This invention relates to improvements in attachments for grain drills, more particularly to devices of this character in which a double disk furrow opener forms a part of the structure, and has for one of its objects to provide a simply constructed attachment whereby the contact between the disks is maintained against the resistance of the earth through which the disks are moved, and with means for adjusting the attachment to compensate for wear.

Another object of the invention is to provide a simply constructed attachment which may be applied without material structural change to double disk drilling devices of various sizes and forms of supporting mechanisms, and to drilling machines of the various makes in common use.

With these and other objects in view, the invention consists in certain novel features of construction, as hereinafter shown and described and then specifically pointed out in the claims; and in the drawings illustrative of the preferred embodiment of the invention—

Figure 1 is a side elevation of a conventional supporting "boot" together with one of the disks, the companion disk being detached, and with the improvement applied.

Fig. 2 is a sectional view of a pair of furrow opening disks about on the line 2—2 of Fig. 1, with a pair of the adjusting rollers in position between the disks.

Fig. 3 is a perspective view of a portion of a disk drill illustrating the application of the improved device.

Fig. 4 is an enlarged rear elevation of the improved attachment.

Fig. 5 is a section on the line 5—5 of Fig. 4.

Fig. 6 is a plan view of the parts shown in Fig. 3.

Fig. 7 is a sectional detail illustrating a modification in the construction.

The "boot" portion of the improved device is represented as a whole at 10 and includes a tubular standard 11, the lower end of the latter being provided with obliquely directed journals 12—13 which carry the furrow opening disks 14—15. The disks are in contact at one point as represented at 16, the journals 13 being so disposed that the contact point is about midway between a vertical line and a horizontal line. When thus arranged the inner faces of the disks diverge toward the rear as shown at Fig. 2. In operating devices of this character the disks when drawn through the ground are caused to rotate and separate the ground, or form a furrow therein, and the pressure of the earth against the outer faces of the disks rearwardly of the axial lines has a tendency to move the rear portions of the disks toward each other and to correspondingly separate the contact points 16. The principal object of the present invention is to apply a constant outward strain against the inner faces of the disks rearwardly of the axle or journals, and thus maintain the contact points 16 in constant engagement against the resistance of the pressure of the earth rearwardly of the axles or journals. The improved attachment includes a pair of rollers 17—18 located to operate in face contact with each other and likewise to operate against the inner faces of the disks rearwardly of the axles 12—13. By this means the tendency of the pressure of the earth against the outer faces of the disks is counteracted and effectually resisted, so that the disks are maintained in constant contact at the point 16.

Means are provided in the improved attachment for adjusting the rollers toward and away from the axial lines of the disks to compensate for wear, and to adapt the device to the locations of the disks and to any change of position of the same. An approved supporting means comprises a housing or covering represented as a whole at 19 and provided with suitable bearings 20—21 for the journals 22—23 of the rollers. At its side edges the housing 19 is turned inwardly as represented at 24—25 to form scrapers operating in relatively close contact with the rollers, to prevent earth adhering thereto and being carried over between the rollers. The scraper portions of the housing likewise prevent stones and like objects from passing between the rollers. At is ends the housing 19 is preferably extended downwardly as represented at 26, to a line below the lower lines of the rollers to effectually protect the same from dust or the like.

Rising from the housing 19 is a guide lug 27 having a reduced upper portion 28 engaging in a guideway 29 in a bracket 30, the latter being attached by clamp bolts 31 or other suitable fastening devices to the adjacent portion of the boot 10. Bearing upon the bracket 30 is a clamp plate 32 which extends over the upper face of the bracket externally of the guideway 29 and is secured to the reduced portion 28 of the lug by cap screws 33. By this means the housing 19 is coupled to the bracket 30 and adjustable longitudinally thereof within the range of the guideway 29, and may be rigidly coupled to the guideway by operating the cap screws 33. By this simple means the housing and the rollers may be adjusted toward or away from the axles of the disks, to compensate for wear between the disks.

The journals 22—23 of the rollers 17—18 are hollow as represented in Fig. 5 and are rigidly supported in the bearings of the housing and held from turning therein, while the rollers are free to rotate upon the journals. Each hollow journal is provided with a plurality of orifices 34 to permit a suitable lubricant to pass to the rollers, the lubricant being supplied by suitable grease cups represented at 35. By this means the rollers are lubricated without danger of interference from dust or grit.

The holding bolts 31 preferably operate in a slot in the "boot" member 10, represented at 36, to enable the bracket 30 to be adjusted relative to the boot. By this means the contact location 16 may be changed, if required.

In Fig. 7 a modification in the construction is shown consisting in mounting the journals 22—23 of the rollers in yieldable bearings 37 so that in event of obstructions such as small stones getting between the rollers, the latter will yield and permit the obstruction to pass.

The disks 14—15 are sufficiently resilient to yield laterally with the lateral movements of the rollers as above described without injury thereto.

The housing 19 is preferably provided with clefts 38, so that the scraper edges 25 will bear yieldably against the adjacent faces of the rollers and automatically adapt them to the varying surfaces of the rollers.

Having thus described the invention, what is claimed as new is:

1. An attachment for grain drills comprising coacting rollers adapted to operate in face contact with the confronting faces of furrow opening disks and in face contact with each other, and means for adjusting said rollers radially of the disks.

2. An attachment for grain drills comprising coacting rollers adapted to operate in face contact with the confronting faces of furrow opening disks and in face contact with each other, means for adjusting said rollers radially of the disks, and means for adjusting said rollers circumferentially of the disks.

3. The combination with the boot portion and furrow opening disks of a grain drill, of a housing, coacting rollers supported within said housing and operating in face contact with the confronting faces of the disks and in face contact with each other, a bracket device connected to said housing, and means for supporting said bracket device from said boot portion.

4. The combination with the boot portion and furrow opening disks of a grain drill, of a housing, coacting rollers supported within said housing and operating in face contact with the confronting faces of the disks and in face contact with each other, a bracket device, means for adjustably supporting said housing from said bracket device, and means for adjustably supporting said bracket from said boot portion.

5. An attachment for grain drills comprising coacting rollers adapted to operate in face contact with the confronting faces of furrow opening disks and in face contact with each other, and means for yieldably supporting said rollers.

6. The combination with furrow opening disks, of coactive rollers operating in face contact with the confronting faces of the disks and in face contact with each other, and means for yieldably supporting said rollers.

In testimony whereof I affix my signature.

WILLIAM A. FIFIELD. [L. S.]

Copies of this patent may be obtained for five cents each, by addressing the "Commissioner of Patents, Washington, D. C."